(12) United States Patent
Chinni Vergottini et al.

(10) Patent No.: US 10,232,978 B2
(45) Date of Patent: Mar. 19, 2019

(54) LIGHT AND INTEGRATED JUNCTION SYSTEM OF THE WALLS OF A COLLAPSIBLE CONTAINER

(71) Applicant: WENCO S.A., Huechuraba, Santiago (CL)

(72) Inventors: Pedro Chinni Vergottini, Santiago (CL); Francisco Sahli Costabal, Santiago (CL)

(73) Assignee: WENCO S.A., Huechuraba, Santiago (CL)

( * ) Notice: Subject to any disclaimer, the term of this patent is extended or adjusted under 35 U.S.C. 154(b) by 0 days.

(21) Appl. No.: 14/639,370

(22) Filed: Mar. 5, 2015

(65) Prior Publication Data

US 2015/0284135 A1    Oct. 8, 2015

(30) Foreign Application Priority Data

Apr. 8, 2014    (CL) .................................. 0879-2014

(51) Int. Cl.
*B65D 6/34* (2006.01)
*B29C 45/00* (2006.01)
(Continued)

(52) U.S. Cl.
CPC .......... *B65D 11/22* (2013.01); *B29C 45/0017* (2013.01); *B65D 11/18* (2013.01);
(Continued)

(58) Field of Classification Search
CPC . B65D 11/1873; B65D 11/1893; B65D 11/18; B65D 11/1833; B65D 85/34; B65D 11/1866; B29C 45/0017
See application file for complete search history.

(56) References Cited

U.S. PATENT DOCUMENTS 4,570,814 A * 2/1986 Seeley .................... F24F 13/20
                                                                220/4.28
4,597,503 A    7/1986 Lates
(Continued)

FOREIGN PATENT DOCUMENTS

CL    0671-1990    12/1990
CL    1075-2009    5/2009
(Continued)

OTHER PUBLICATIONS

Eloshway, Niki Marina; Non-final Office Action issued in U.S. Appl. No. 14/639,367; dated Sep. 25, 2015; 8 pages.
(Continued)

*Primary Examiner* — Andrew T Kirsch
*Assistant Examiner* — Don M Anderson
(74) *Attorney, Agent, or Firm* — Ulmer & Berne LLP (57) ABSTRACT

The present invention comprises a junction system of structures, preferably for container walls, which is light and is integrated to the structures to be joined providing high strength and rigidity reducing the weight of the joint, which comprises at least a closing device having at least a pair of closing means, a male closing mean and a female closing mean, wherein said closing means join at least two structures together, or two adjacent faces of a container for fruit and vegetable products, preferably the side faces, being fixed to said structures or faces; further comprising a column fixed to one of said structures, wherein said column is configured as a hollow cylindrical body which in turn is integrated to at least one of said closing means. Furthermore, the invention comprises an associated container and its manufacturing process.

21 Claims, 10 Drawing Sheets

(51) Int. Cl.
*B65D 6/16* (2006.01)
*B65D 6/24* (2006.01)
*B65D 21/02* (2006.01)
*B65D 85/34* (2006.01)
*B65D 6/18* (2006.01)

(52) U.S. Cl.
CPC ...... *B65D 11/1833* (2013.01); *B65D 11/1866* (2013.01); *B65D 21/0209* (2013.01); *B65D 85/34* (2013.01)

(56) References Cited

U.S. PATENT DOCUMENTS

| | | | |
|---|---|---|---|
| 4,662,532 A * | 5/1987 | Anderson | B65D 19/12 220/1.5 |
| 4,731,014 A | 3/1988 | Von Holdt | |
| D313,493 S | 1/1991 | Apps et al. | |
| 5,332,115 A | 7/1994 | Schafer | |
| 5,642,830 A * | 7/1997 | Foster | B65D 7/24 220/4.28 |
| 5,735,431 A | 4/1998 | LeTrudet | |
| 6,047,844 A | 4/2000 | McGrath | |
| 6,073,790 A | 6/2000 | Umiker | |
| 6,142,329 A * | 11/2000 | Dotan | B65D 19/18 220/4.33 |
| 6,179,156 B1 | 1/2001 | Aiken | |
| D438,703 S | 3/2001 | Campbell | |
| 6,386,388 B1 | 5/2002 | Overholt | |
| D462,522 S | 9/2002 | Apps et al. | |
| 6,749,077 B1 | 6/2004 | McAlpine et al. | |
| 6,793,085 B1 | 9/2004 | Russo | |
| 6,953,116 B2 | 10/2005 | Verna et al. | |
| D553,859 S | 10/2007 | Fernandez et al. | |
| D598,684 S | 8/2009 | Stahl | |
| D600,019 S | 9/2009 | Cope | |
| D600,020 S | 9/2009 | Cope | |
| D600,917 S | 9/2009 | Meter | |
| 7,641,066 B2 | 1/2010 | Baltz | |
| D628,801 S | 12/2010 | Talbot Pouliot et al. | |
| 7,861,864 B2 | 1/2011 | Hassell et al. | |
| D672,961 S | 12/2012 | Turner | |
| 8,469,224 B2 | 6/2013 | Orgeldinger | |
| D688,869 S | 9/2013 | Lindstrom | |
| D688,902 S | 9/2013 | Hertaus | |
| D698,604 S | 2/2014 | Tsai | |
| 8,640,912 B2 | 2/2014 | Orgeldinger | |
| 8,757,412 B2 | 6/2014 | Sommer et al. | |
| 8,833,594 B2 | 9/2014 | Stahl | |
| D749,323 S | 2/2016 | Stahl | |
| 2005/0205578 A1* | 9/2005 | Yeh | B65D 7/20 220/485 |
| 2006/0231555 A1 | 10/2006 | Smyers et al. | |
| 2008/0190922 A1* | 8/2008 | Kraeling | B65D 7/24 220/6 |
| 2013/0175265 A1 | 7/2013 | Sommer et al. | |
| 2015/0283745 A1 | 10/2015 | Chinni Vergottini | |

FOREIGN PATENT DOCUMENTS

| | | |
|---|---|---|
| CL | 0187-2013 | 1/2013 |
| DE | 19614530 A1 | 10/1997 |
| EP | 0867113 B1 | 5/2002 |
| GB | 951891 | 3/1964 |
| WO | 0041938 A1 | 7/2000 |
| WO | 0194214 A1 | 12/2001 |
| WO | 2013002725 A1 | 1/2013 |

OTHER PUBLICATIONS

Eloshway, Niki; Final Office Action issued in U.S. Appl. No. 14/639,367; dated May 6, 2016; 13 pages.
Eloshway, Niki Marina; Non-Final Office Action issued in U.S. Appl. No. 14/639,367; dated Dec. 15, 2016; 8 pages.
Eloshway, Niki Marina; Final Office Action issued in U.S. Appl. No. 14/639,367; dated Jun. 13, 2017; 7 pages.
Eloshway, Niki Marina.; Non-Final Office Action issued in U.S. Appl. No. 14/639,367; dated Feb. 7, 2018; 9 pages.
Eloshway, Niki; Final Office Action issued in U.S. Appl. No. 14/639,367; dated Oct. 1, 2018; 11 pages.

* cited by examiner

LIGHT AND INTEGRATED JUNCTION SYSTEM OF THE WALLS OF A COLLAPSIBLE CONTAINER

FIELD OF THE INVENTION

The present invention refers to a junction system that is light and integrated between structures such as walls of a container for fruit and vegetable products, which improves the joint strength and reduces the weight thereof and, therefore, of the structures that are joined by means of said system.

Additionally, the present invention relates to a collapsible container wherein the walls are joined together by means of the junction system of the invention, improving the strength of containers and reducing their weight.

Finally, the invention also relates to the manufacturing process of a container incorporating the junction system of the present invention.

BACKGROUND OF THE INVENTION

Junction systems between structures are widely known in the art, mainly regarding the collapsible plastic containers. Such junction systems comprise locking devices to set fixed or detachable joints, maintaining the robustness of the container, for example for fruit and vegetable products, regarding the joint of the walls forming said container.

The application US 2013175265 proposes a container which has collapsible walls having an attachment mechanism between side walls comprising latching means integrated into the structures to be joined, wherein said latching means are deployed on most of the periphery of said structures. In this regard, the attachment mechanism proposed by the document US2013175265 proposes a complex system with a large number of components, which considerably increases the weight of the container. Furthermore, said system does not propose solutions aimed to increase the resistance of the assembled proposing profile style vertical structures that introduce a substantial increase in weight that does not necessarily lead to better properties for bonded structures. Therefore, it is necessary to propose a lightweight system capable of improving the resistance of the container while the weight that is added to the whole system is reduced.

Documents WO0041938, WO0194214 and U.S. Pat. No. 6,749,077 propose a collapsible wall container wherein said walls are joined by means of a corner element which is mounted between walls. Said corner element is an element which acts as external column and attachment mechanism integrating binding structures with increased resistance. In this context, although the corner element provides an increase in the strength of the container, said component means a further increase in weight and manufacturing costs due to its independence of the container, making it necessary to propose an attachment mechanism integrated into the container that take charge of resolving such problems.

Easier solutions as proposed by the document WO2013002725 for collapsible containers that binds only by latching means along the connection zone. Such solutions are lightweight and propose a strong joint, however, does not allow incorporating such resistance to the assembled whole since there are no structural components acting to affect rotation, compression, tension and bending of the structures to be joined. In this sense, the ribs commonly used do not resolve commonly efforts types involved in these structures. Therefore, a solution that would solve the above problems, providing a bonding system that integrates the structure and transmits its strength properties and low weight of this structure is needed.

Moreover, documents EP0867113, DE19614530 and GB951891 propose containers with corners of high strength, column shaped, increasing the strength of the container itself. However, the solutions proposed in documents EP0867113, DE19614530 and GB951891 do not comprise collapsible containers so the use of such high strength structures is simplified to be integrated with fixed walls. In this context, there is no bonding system comprising a point of weakness that should be reinforced itself to avoid weakening the container. Additionally, such containers comprise fixed structures transportation and storage difficult. Then, it becomes necessary to provide collapsible containers that offer great resistance walls despite to comprise junction systems between walls that usually mean the configuration of weak points in the container.

Consequently, there are problems related to junction systems in folding boxes that have not been resolved by the prior art, where it requires light junctions that do not involve significant structural changes in the containers but that increase their resistance without meaning additional costs in both manufacturing and operation. Here, preliminary estimates indicate that the columns, the resistance elements that provide the container in the areas of junction faces, comprise about 25% of the total weight of the container due to the concentration of material. Then, it is necessary to propose columns that, incorporated into a junction system structures, reduces the overall weight.

DESCRIPTION OF THE INVENTION

As previously introduced, the present invention relates to a lightweight junction system between structures, such as faces of a container for fruit and vegetable products, which is integrated into such structures improving the joint strength at a low weight and, therefore, increasing the resistance of the structures that are joined by means of said system at a reduced overall weight of the assembly. Moreover, the present invention also comprises a collapsible wall container where said walls are joined together by means of the junction system of the invention, improving the strength of containers and reducing the weight thereof.

The light and integrated junction system of the of the present invention comprises at least one locking device, preferably of the clip type, having at least a pair of closure means, a male closure mean and a female closure mean, wherein said closure means joining at least two structures or two adjacent faces of a container for fruit and vegetable products, preferably the lateral faces, when being fixed to said structures or faces. In this regard, the closure means allow increasing the rigidity of the connection making it similar to the rigidity of one piece or monoblock containers.

Further, such light and integrated junction system comprises a column that is fixed to one of said structures or faces wherein said column is configured as a hollow cylindrical body, preferably circular, which in turn is integrated to at least one of said closure means. Said column, is located at any point along the structure to be joined, preferably being placed on the corner which is set to the same joining zone of these structures. In this regard, while the column is part of the junction system of the invention, said system since is integrated to the structures to be joined is placed as a whole in such structures, resulting in an only component integrating junction system column and structure to unite.

In this regard, by cylindrical body it must be understood any structure generated by parallel displacement of a straight line called generatrix along a flat curve, closed or open. For example, if the directrix is a circle and the generatrix a line perpendicular to said directrix the cylindrical body is a straight circular cylinder. In this context, in a preferred embodiment of the invention the column is configured as a straight hollow cylinder whose cross section is a circle. In alternative embodiments the cross section of the cylindrical body can be oval, polygonal, with open or closed "U" shape, or any shape which allows to be configured as a hollow cylindrical body. The column plays an important structural function in the junction system, enabling a high resistance to both bending and compression, and improves the system's cooling during molding through water circulation cooling in the mold, particularly with regard the portion of the mold that shapes the inside of the column, reducing the manufacturing cycle time of the system. In this sense, according to a preferred embodiment of the invention the thickness of the wall of the column is 1.2 mm, and can be any thickness to maintain the strength of the column and does not consist in an unwanted increase in material required and the weight of the structure. In this context it is important to consider that the corners of a container are those that resist the weight thereof during stacking, which makes evident the importance of resistance of the columns and the junction system that is housed in said corners, also reinforcing that said connecting zone is the preferred point to place the columns of the system of the invention.

As mentioned above the junction system of the invention is integrated in the structures with joints, where both column and closure means are part of at least one of said structures. Thus, the junction system of the invention can be manufactured together in an integrated manner and in the same material that the structures that will use it. In one embodiment of the invention such structures are faces of a container, preferably a collapsible container, wherein at least one closure means is fixed to the column, which in turn is fixed to a first side face of the container, while at least another locking means is fixed to a second side face adjacent to the first. Additionally, the column may comprise a base or bottom portion which is fixed to the bottom face of the container, so that when side faces join together the column is mounted on the base or bottom portion forming a continuous structure together with the joining of the side faces. In one embodiment of the invention said lower portion comprises a part of the same column, which engages on said top portion during the locking of the junction system, forming a single column located in the joining area between adjacent faces or structures. It is important to clarify that a container according to the present invention possesses four locking systems with columns, one at each corner, where the column would be integrated only to one of the side walls of said four junctures. In this context, the junction system must be sufficiently robust to allow that one of the walls does not have the column as a structural element at their ends and should transmit the strength and stiffness of the component to the wall that is not integrated to the column.

Considering the above, the junction system of the invention proposes at least one locking device integrated into the structure that is responsible for configuring the lock of the junction system, wherein said closure may be detachable or not depending on the mode of the invention. In this context, the locking device comprises at least a pair of closure means configured as a male closure means and a female closure means, which latch together establishing a binding and/or closure between structures. Additionally, the closure means can be active or passive, where active closure means comprise closure means latch together fixing the system's lock and the passive closure means latch together establishing support points which are not fixed. In this context, the invention comprises at least a pair of active closure means, whereas embodiments thereof further comprise one or more pairs of passive closure means. In one embodiment of the invention the locking devices are of the clip type, wherein active closure means comprises male closure means configured as a protrusion or a stepped profile that latches in a slot present in the female closure means so that binding of said protrusion with said slot provides the attachment point that ends the closing of the junction system. Such binding works to compression when a force is applied that tries to force the opening, pressing against the walls the slot if being forced to the opening. Here, the stepped design at the end enables the active closure means to continue fulfilling its function even when certain imperfections appear in its outline due to manufacturing mold wear, wear focusing on the edges of the mold and, therefore, in the ends of the parts to be manufactured. Then, as the outer edges of active means active closure means or clip not interfere with the mechanism in the closure area given by the stepped profile, the closure is not impaired by imperfections resulting from manufacturing.

The closure means of the invention are integrated into the structures forming part thereof without meaning a substantial increase in the volume occupied by said structures and geometrical variations in its perimeter. Thus, a preferred embodiment of the invention comprises closure means that are located in the same plane of the structures to be joined, preventing to protrude from the perimeter for the purpose of reducing the damage of the junction system, the volume occupied by this and inadvertent operation in the mode of detachable attachment system. Respect to the mode referred to a collapsible walls container, closure means are configured along the height of the side walls to be joined, comprising projections of said walls forming grooves and protrusions comprising male and female active closure means respectively. In this regard, the closure means are preferably broad elements with a width equivalent to the structure in which they are fixed, increasing with this the contact surface for the closure elements and thus increasing the strength of the bond and of the structure to mechanical stresses acting on it, such as rotation, compression, tension and buckling. Additionally, in embodiments of the invention, the closure means that are fixed to the column are configured as elements that born from the side of the column outside the perimeter thereof extending tangential to said column when it is a corner element. Thus, the column is slightly displaced from the junction zone where structures to be joined are placed. Moreover, in other embodiments the closure means fixed to the column born directly tangential to it within its perimeter, that is, so that the column is positioned directly over the zone of junction of structures.

The particular location of closure means is independent of its operating exist modes in which the male closure means are integrated into the column, and thereby into a first structure, and female closure means are integrated to a second structure, while in other embodiments it will have female closure means integrated to the fixed column to the first structure and male closure means to the second structure. Additionally, there are embodiments of the invention comprising more than one pair of closure means, where it's possible that each structure to be joined may have only one type of closure means, male or female, or that each structure possessing both male closure means and female closure means so that each of said locking means comprising its complementary pair in the other structure to be joined.

Additionally, the junction system of the invention, and in particular the column that integrates this system comprises stacking means which are configured as such once the junction system is assembled. Here, structures utilizing the junction system of the invention comprise columns providing stacking means which latch together with the bottom of the structures being stacked, particularly with the bottom of the columns that has the junction system of said structure. In this sense, the columns supports the entire load during stacking, becoming evident the relevance of its resistance to compression and buckling stress. According to one of the embodiments of the invention described above, the column comprises a base or bottom portion forming part of one of the structures to be joined, such as the underside of a container for fruit and vegetable products, over which the column is latched during system assembly. In said embodiment, the column base or bottom portion comprises means for stacking that latch together with the stacking means that the column of another container has at its top, in order that a first structure or container for fruit and vegetables is stackable securely over a second structure or container.

Moreover, in one embodiment of the invention the junction system is used in collapsible structures which can be stacked together in the folded position, which helps to reduce the volume of storage and transport of such structures or folded containers. In this alternative, the structures of the invention comprise surfaces adapted to accommodate the junction system when the structure or container is folded and stacked, reducing the space occupied by said system and, therefore, reducing the space between structures or containers stacked. In this regard, each surface adapted to accommodate the junction system is located in a first set of structures or walls of a first container so that it houses the junction system mainly the column belonging to a second set of structures or to a second container that is stacked adjacent to the first. In this sense the distance between two structures or collapsible containers during stacking is reduced, preferably 32 mm or less. Surfaces adapted to accommodate the junction system of the invention can extend over part of the structures, providing surfaces that fit junction systems, or over the entire length of the structure to facilitate fabrication thereof.

The junction system according to the embodiments described above can be used in any type of structures or containers being manufactured integrally with them and adapting both to the volume occupied by these structures and containers, as well as adapting to the assembly and disassembly configurations, stacking, folding and storage, among others, being a very robust system but also lightweight and integrated to the structures that employ, increasing resistance, reducing weight and maintaining a space utilization commensurate with the operational requirements of high standard, i.e., maximizing cargo space of containers and minimizing the additional volume occupied by the system during operation or in storage.

In this sense, an alternative embodiment of the invention contemplates implementing a container junction system according to that described above, wherein said container comprises a general optimization of weight and strength in order to increase or maintain the strength of the container while reduces the material needed to manufacture and, therefore, the final weight of the container. In this regard, it is relevant to indicate that the containers comprise mostly large storage volumes given by a wide opening surface, resulting in use of large bottoms. Those bottoms can concentrate large weights around 50% of the total weight of the containers, resulting in a relevant element optimization at the moment of reduce the weight of said containers.

In this sense, an embodiment of the invention contemplates a container for fruit and vegetable products with high strength, stiffness and light weight, which comprises at least one background, collapsible sidewalls located on the side and front faces of the container and alternatively a cover located on the upper side of the container, wherein the cover can comprise a cover that spans the entire upper face of the container or part thereof as well as any element that is located in said upper face of the container, for example tensioning elements between side walls. In addition, the collapsible side walls are adapted to be configured in a folded position for storage and transport, and an unfolded, for storage of horticultural products and transport thereof. In this context, the present embodiment of the invention comprises collapsible side walls having ends in which the junction system described above is incorporated, to a container which is implemented to a container either alone or in combination with a bottom of varying height optimizing the use of the material to distribute the stresses to which the bottom is subjected, thereby reducing the final weight of the container without losing strength. Said bottom is mainly composed of a bottom base comprising nerves that are configured with a variable height depending on the load distribution over said bottom, wherein said variable height ribs help maintain the resistance at certain points, using a greater height of said ribs, and reduce the use of material in other parts, reducing the height of the ribs. In this regard, nerves of variable height may have various shapes and configurations being preferred to find T-shaped ribs disposed in diagonal arrangements in the bottom of the container.

Regarding the manufacturing method of the junction system of the invention, in particular of a collapsible container that incorporates said system, is relevant to indicate that said procedure consists in injection molding, which comprises employing a mold with the shape of the collapsible container with the junction system and injecting material, preferably plastic into said mold. Moreover, this procedure occurs in series, being relevant to reduce the time between the stages to increase manufacturing capacity. In this sense, a preferred embodiment of the procedure considers the following general steps:

Injecting plastic into a closed mold;
Cooling the structure fabricated into the mold;
Open the mold for removal of the manufactured structure; and
Close the mold to start a new cycle of manufacture.

In this context, the molds used in those processes comprise at least two halves, one half of injection and another of mold, defining an interior cavity in the shape of the junction system and structure to be joined. Said mold comprises a continuous cooling mechanism which allows reducing the temperature of the injected material before removing the manufactured part. In this context, the material is injected at high temperature, preferably a temperature that allows the smooth flow of the material, such as 230° C. for plastic, being necessary to wait for cooling of the manufactured structures before removing the end piece. Then, the mold cooling mechanism allows accelerating the cooling of the material with consequent acceleration of the end piece extraction. Preferred embodiments of the cooling mechanism comprises molds with internal channels through which a cooling medium is continuously circulated, such as water, that is at low temperature, for example 12° C., wherein said flow accelerates heat transfer from the material hot to the mold and eventually into the cooling medium.

Regarding the above, the cooling step is performed by heat transfer from the structure made into the mold, where it is necessary to reach a suitable temperature before removing the piece without this being damaged. At this stage is relevant to indicate that the structures parts to be manufactured are cooled in a differentiated way, existing areas of the structure which are cooled more slowly than others. According to the plastic containers manufacture material concentration areas, such as columns, are a point of relatively slow cooling from the rest of the structures, which can be explained by the small contact area between the concentration of material for effects of mold heat transfer. In this sense, the process of the present invention comprises the manufacture of a container incorporating a junction system with a cylindrical column, which increases the resistance and, at the same time reduce the use of material, wherein the use of said column means a faster cooling than in the case of collapsible containers with solid columns or other reinforcing structures. This effect is achieved by increasing the contact surface between the mold and the walls of the column, producing heat transfer from both the outer wall of the column and from the inner wall. Furthermore, a preferred embodiment of invention comprises a mold with cooling means which circulate within the column, accelerating the heat transfer and therefore in less time cooling the columns of the container. Indeed accelerate the cooling of the container by a more rapid cooling of the columns means reducing the time required for extraction of the container, which results in reduced manufacturing time of the container in question.

Then, the process of the present invention, i.e. the manufacturing process of a container with the junction system of the invention comprises as additional result reduce cycle times and therefore increase the production capacity of the containers employing said system.

DESCRIPTION OF THE FIGURES

The following figures are incorporated by reference and representation of a preferred embodiment of the invention, there may be other embodiments in accordance with the description but not represented in these figures.

DETAILED DESCRIPTION OF THE INVENTION

Figure 1:
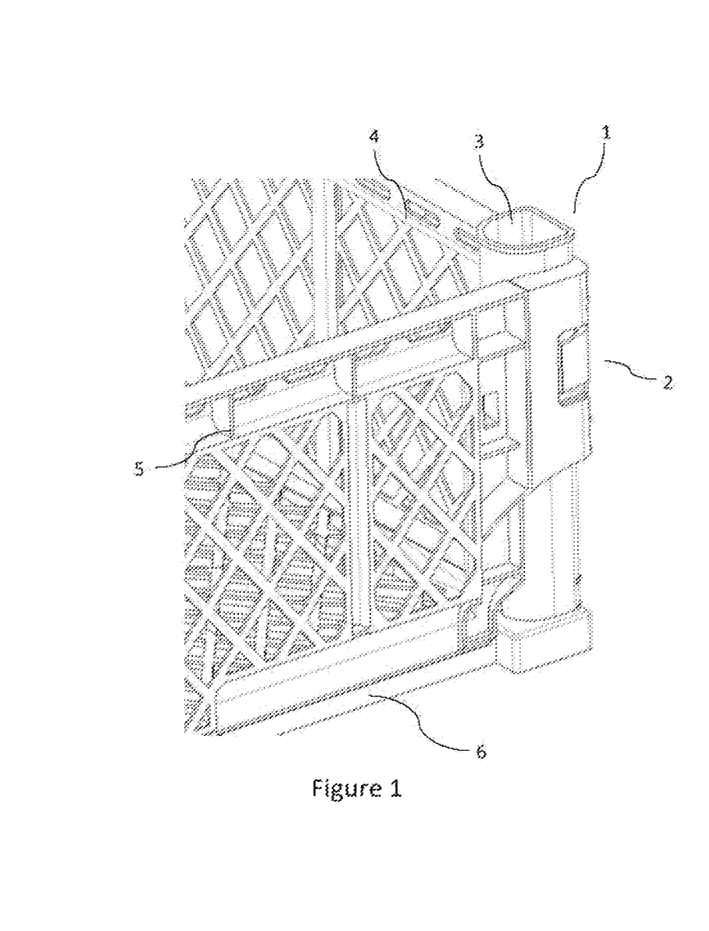
FIG. 1 shows a top perspective view of a first preferred embodiment of the junction system of the invention in its closed position.
Figure 2:
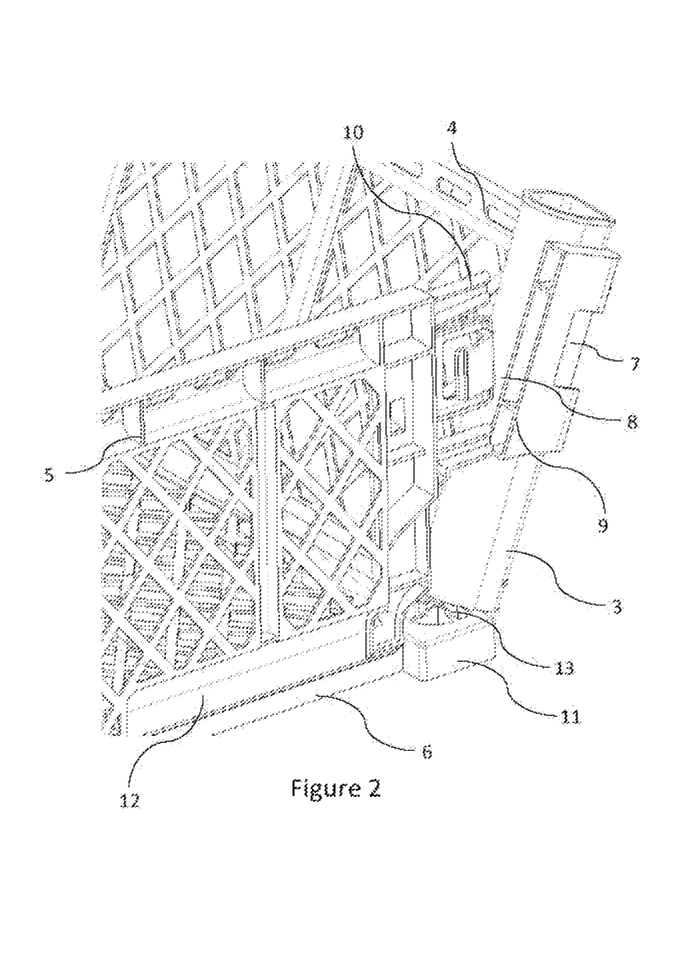
FIG. 2 shows a top perspective view of the junction system according to FIG. 1 in its open position.

FIGS. 1 and 2 expose the junction system 1 according to a preferred embodiment of the invention, wherein a locking device 2 of the clip type that is integrated into a column 3 of cylindrical body, which in this embodiment has a closed "U" shaped section. Said column 3 of cylindrical body 3 and the locking device 2 are integrated to the structures being joined, in particular side walls 4 and 5 and bottom wall 6. While FIG. 1 depicts the above elements assembled or joined position, i.e. where the locking device 2 is closed or fixed on, FIG. 2 shows the open locking device where one of the side walls 4 is out of the assembled position. In this context, FIG. 2 shows the closure means employed by the invention, wherein an embodiment of these comprises active closure means, particularly active female closure means 7 that fit together with the active female closure means 8, and passive closure means, in particular female closure means 9 that fit together with male passive closure means 10.

Moreover, FIG. 2 further states that the female closure means, according to an embodiment of the invention, are integrated in column 3 of the cylindrical body which in turn is integrated into the side wall 4, while the male locking means are integrated into the side wall 5, where the structural element is integrated into one of said walls. In this regard, the bottom wall 6 has integrated a lower portion or base of the column 11 which has latching means for allowing centering the column during assembly or locking of junction system 1.

Furthermore, FIG. 2 also presents the surfaces 12 adapted to house the junction system 1 of the invention in position of folded walls, particularly to accommodate the column portion of said system when the container is fully folded.

Figure 3:
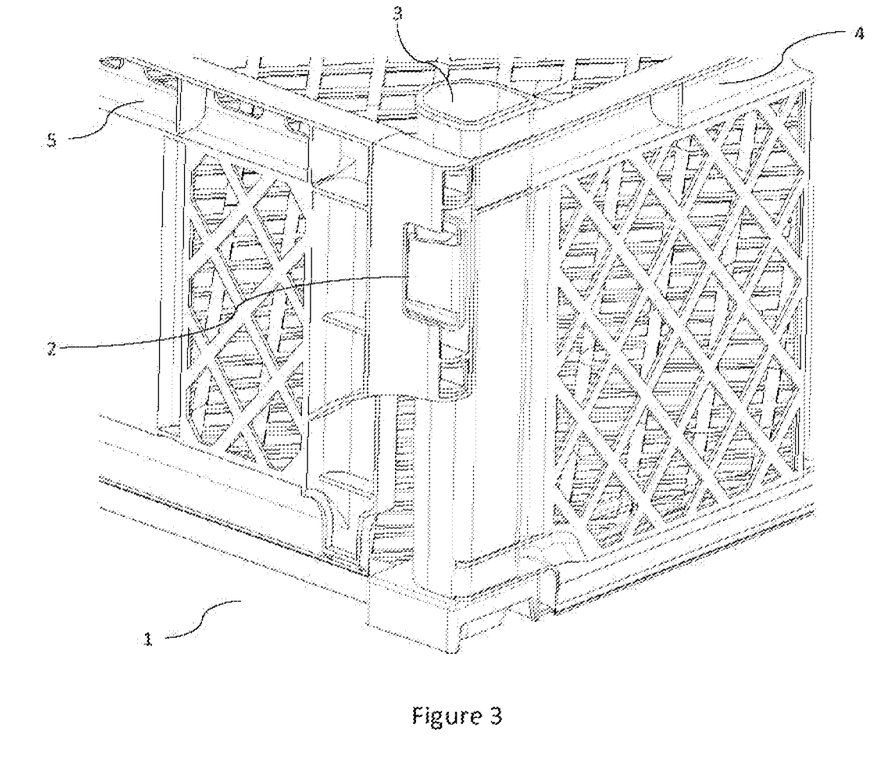
FIG. 3 shows another top perspective view of the junction system according to FIG. 1.

FIG. 3 shows another view of FIG. 1 in which the distribution of components in the closed position is shown, wherein the locking device 2 is of the type clip and provides closure means that latch together. Furthermore, one can see that the side walls 4 and 5, column 3 and locking device 2 forms a junction system 1 integrated to the structures that are joined together. Regarding the spatial distribution of the integrated components, one can see that an embodiment of the invention comprises a locking device 2 integrated to column 3 housed on one side thereof and extending from said side, that is, outwardly the perimeter of said cylindrical body column 3. Thus, the bond between side walls 4 and 5 occurs at a point that does not fit with column 3, being displaced from said union by the external configuration of the locking device 2 in particular of the female closure means 7 and 9 according to FIG. 2.

Figure 4:
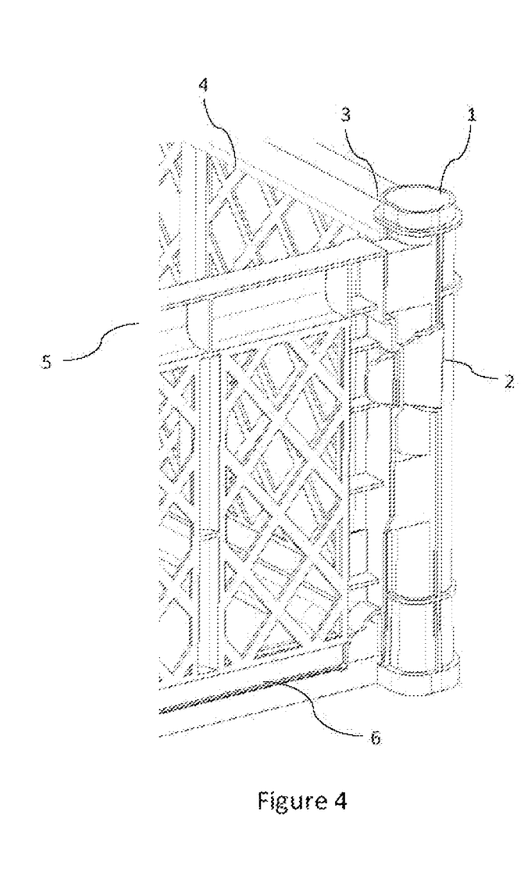
FIG. 4 shows a top perspective view of a second preferred embodiment of the junction system of the invention of the invention in its closed position.
Figure 5:
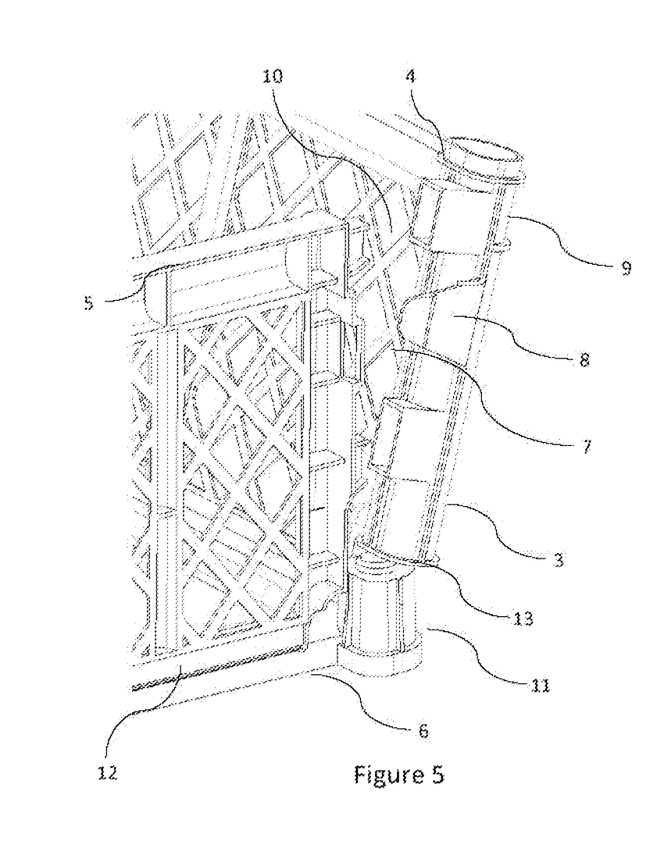
FIG. 5 shows a top perspective view of the junction system according to FIG. 4 in its open position.

FIGS. 4 and 5 teach a second embodiment of the invention wherein a junction system 1 is proposed which column 3 of the cylindrical body has a circular cross section and integrates closure means 2, in particular female closure means 9 and male closure means 8, which extend tangentially from the inner perimeter of the column 3, that is, placing the column directly in the area between side walls 4 and 5. Additionally, FIG. 5 discloses an embodiment in which both the column 3 and the side wall 5 can expose closure means of a different kinds in particular is shown that the side wall 5 proposes integrated passive male closure means 10 and active female closure means 7 while column 3 integrates female passive closure means 9 and active male closure means 8, wherein said active male closure means 8 comprises a flange or stepped profile which is inserted into a slot that comprises the active female closure means 7, and wherein the passive male closure means 10 comprise protrusions that latch in the slots comprised in the passive female closure means 9. Furthermore, this embodiment employs active and passive closure means that are not linked together as taught in FIG. 2 wherein the closure means are part of the same structure, but are distributed separately along the union area between column 3 side wall 3 and 5.

Furthermore, FIG. 5 also exhibits a lower portion of column or base 11 which is large, wherein said lower portion of column 11 is integrated to the bottom wall 6 of the container. In this context, the lower portion 11 also proposes latching means of column 13 which are configured for mounting the column centered in the closed position. In one embodiment of the invention, the lower portion 11 is perforated communicating the inside of the column with the outside both at its upper end and its lower end.

Figure 6:
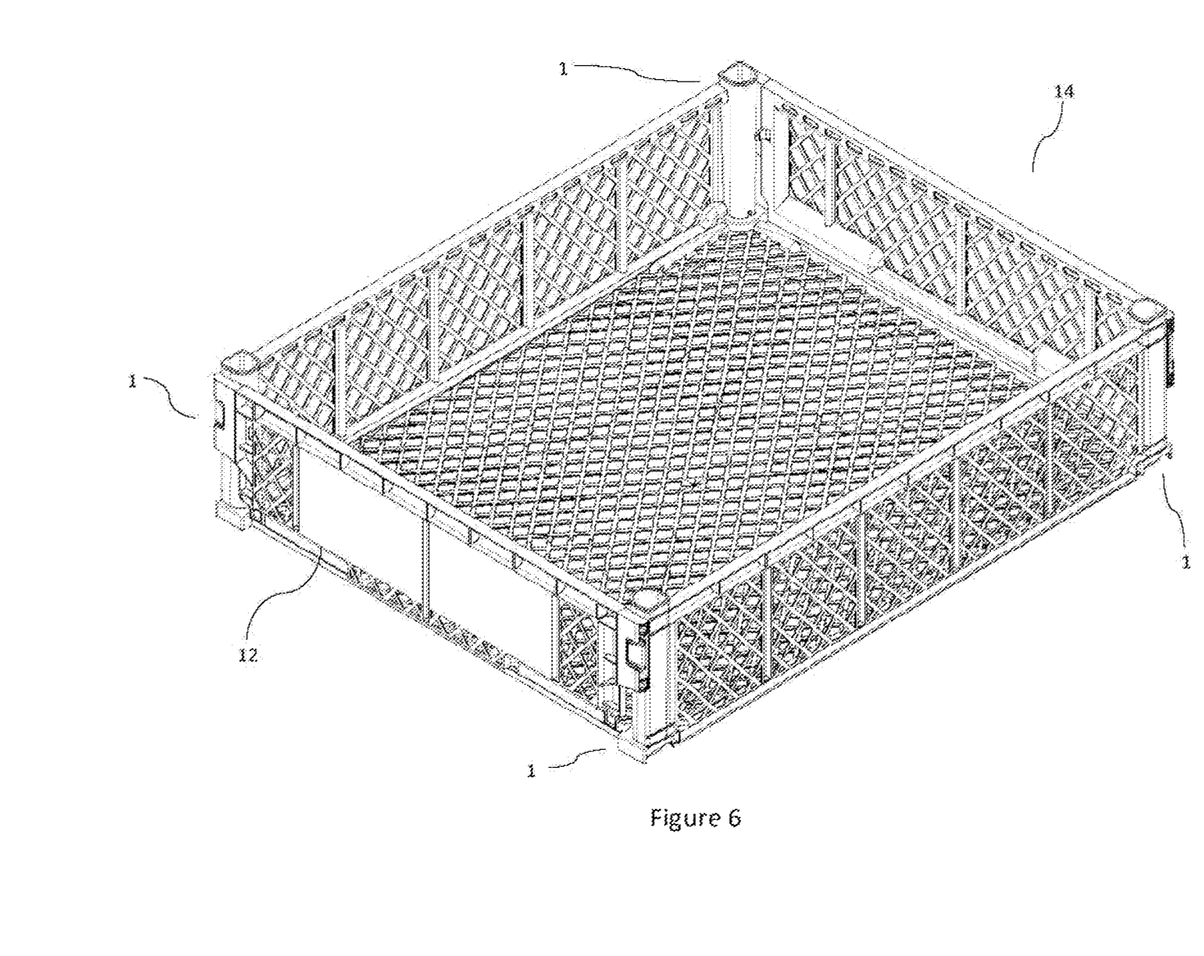
FIG. 6 shows a top perspective view of a container employing the junction system of the invention according to FIG. 1.

FIG. 6 depicts a top view of the container 14 according the invention which comprises at its corners the junction system 1 according to embodiments of the invention, in particular according to the method taught in FIG. 1. Also in FIG. 6 we can also observe the distribution of the surfaces 12 to hold the junction systems according to the invention when containers are stacked in its folded position.

Figure 7:
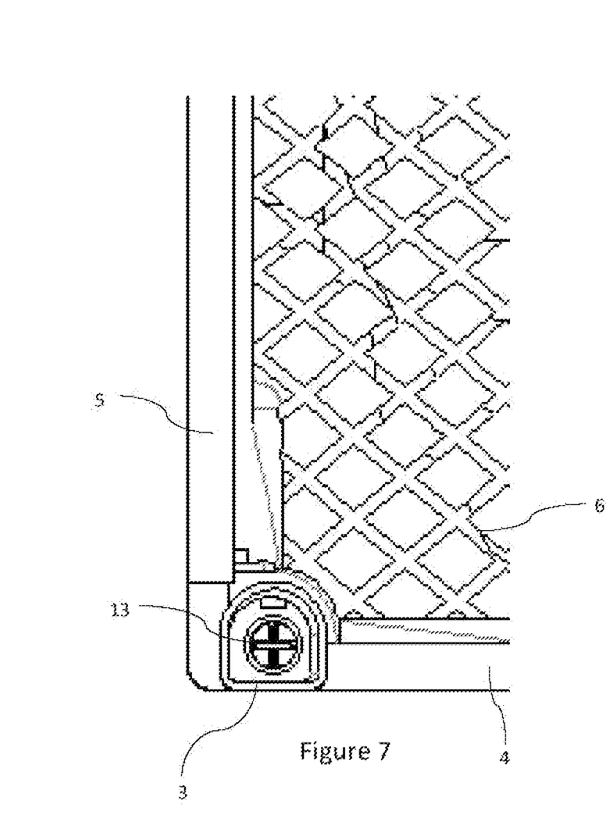
FIG. 7 shows a top view of the junction system of the invention according to FIG. 1.
Figure 8:
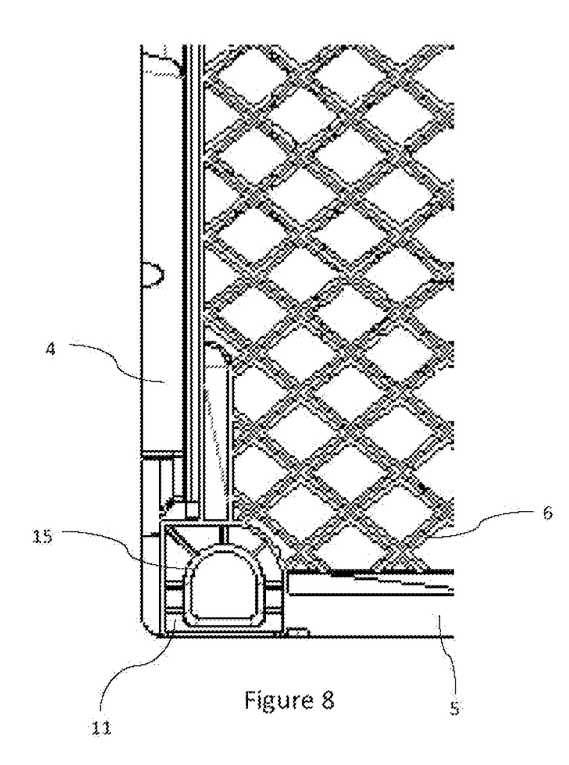
FIG. 8 shows a bottom view of the junction system of the invention according to FIG. 1.

FIGS. 7 and 8 show top and bottom views, respectively of the junction system of the invention in particular the column 3. In this sense, FIG. 7 shows the latching means of column 13 which are in the lower portion column or column base 11, teaching that the column 3 is a hollow cylindrical body. Further, FIG. 8 shows the bottom view of said column base or lower portion of column 11, wherein means for latching 15 disposed to latch on the inside of column 3 from the upper opening of these are taught. In this sense, the latching between upper opening of column 3 and the latching means 15 allow stacking containers in its closed position i.e. in during its use or operation.

Figure 9:
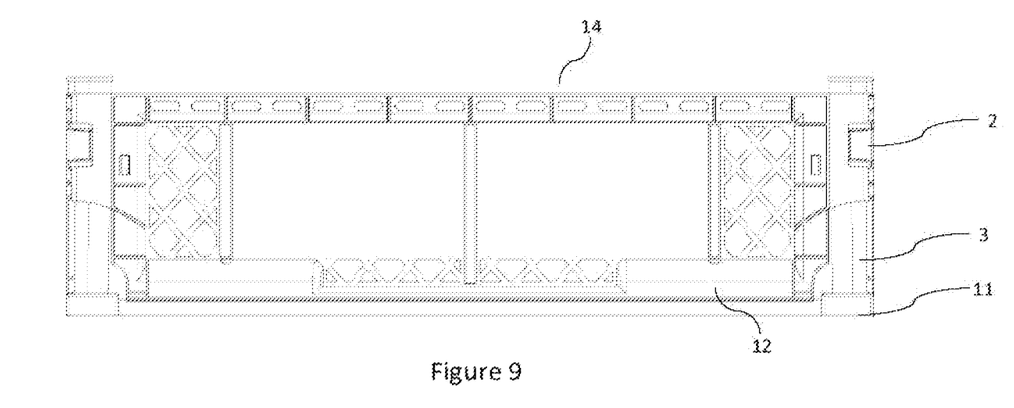
FIG. 9 shows a front view of the container according to FIG. 6.
Figure 10:
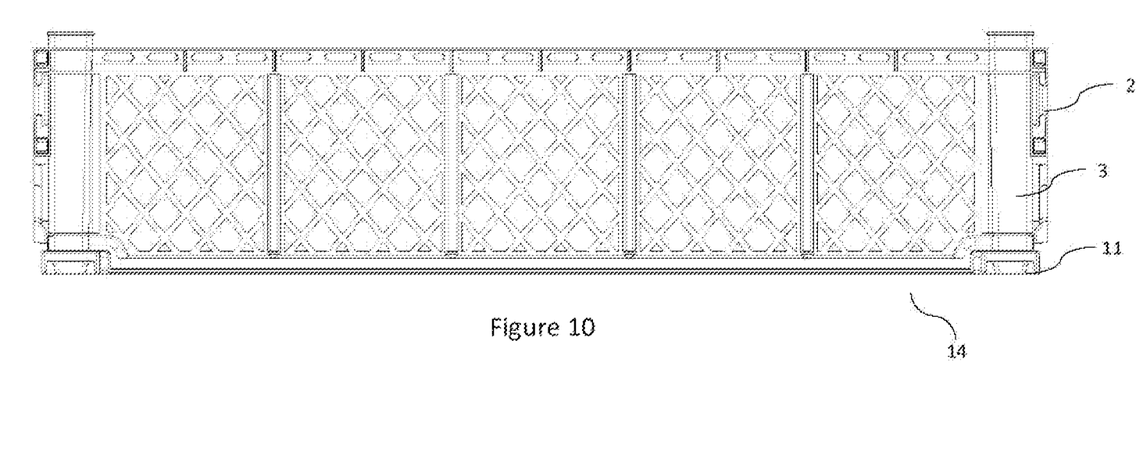
FIG. 10 shows a side view of the container according to FIG. 6.

FIGS. 9 and 10 teach front and side views of the container 14, respectively, where you can appreciate the distribution of the surfaces 12 to accommodate the junction system as well as component distribution relative to said junction system 1, in particular the mode in which the locking device 2 is externally integrated to column 3 protruding from its perimeter.

Figure 11:
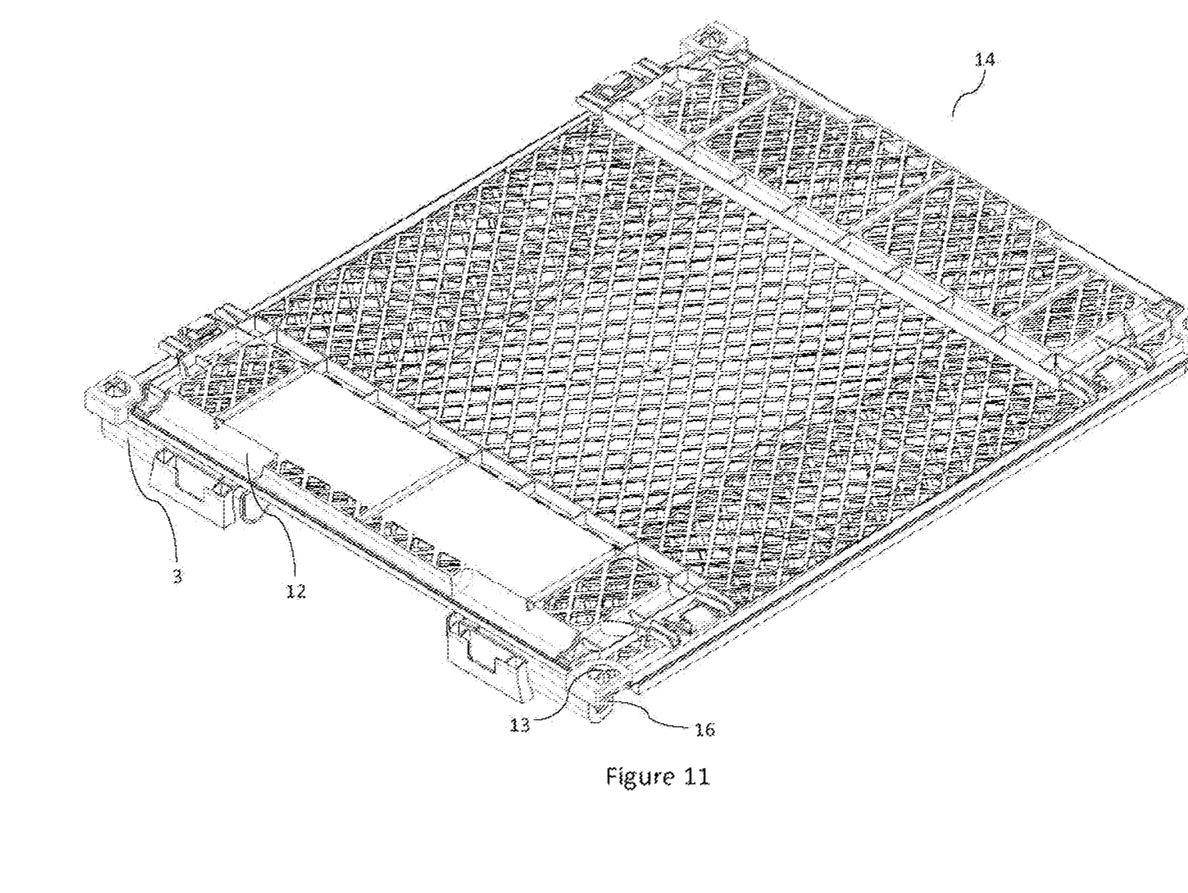
FIG. 11 shows a top perspective view of the container according to FIG. 6 in its folded position.

FIG. 11 shows the container 14 in its folded position, teaching that the surfaces 12 to hold the connecting element are directed outwards for receiving a junction system that is stacked adjacent to container 14. Additionally it is taught that according to one embodiment the side walls that integrate column 3 are folded toward the opposite side of the other side walls, guiding the columns outward the container 14. Moreover, the arrangement taught in FIG. 11 allows observing latching means 16 which has the column 3, wherein said means are which that latch together with latching means of column 13 that has the column base or lower portion 11.

Figure 12:
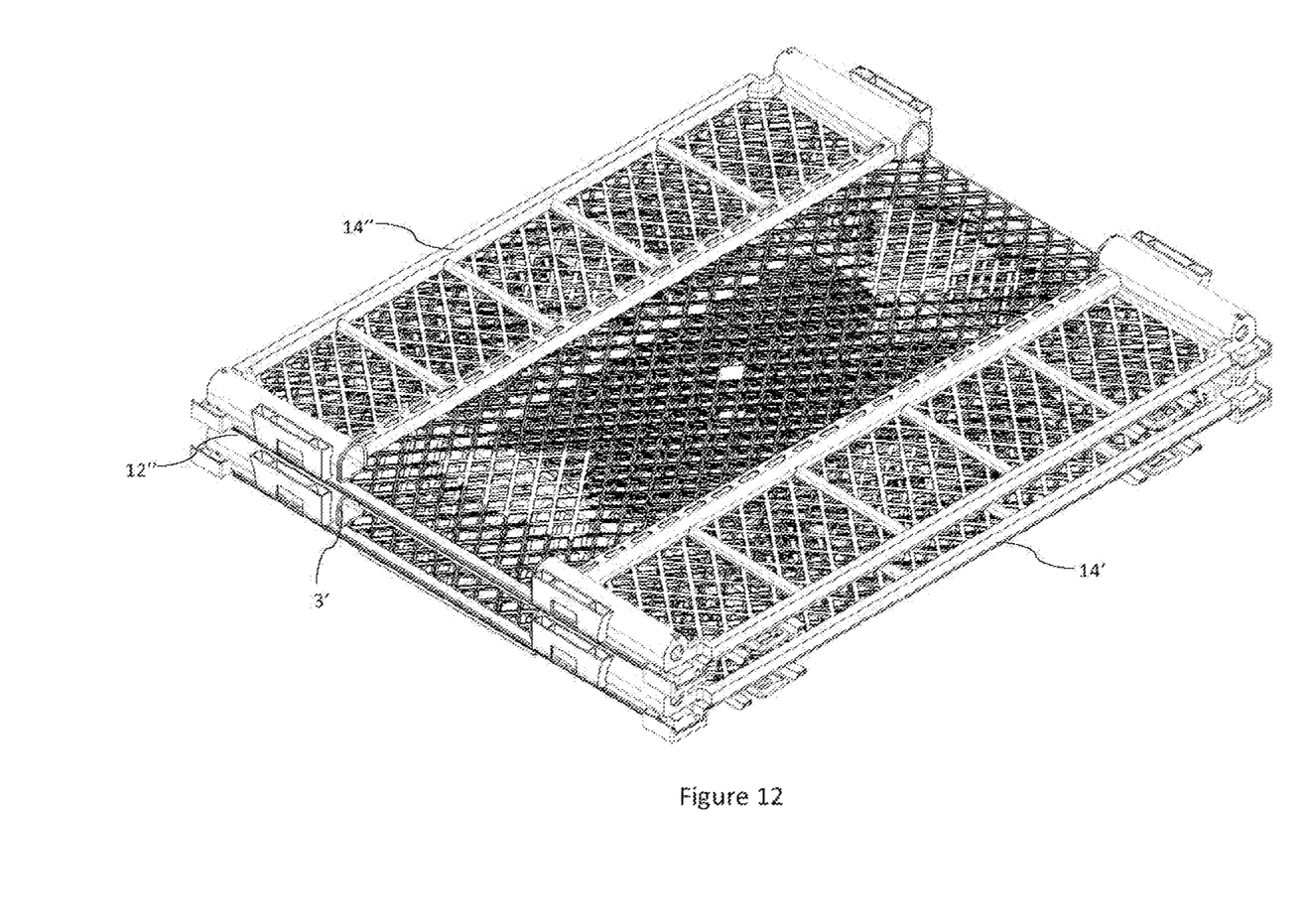
FIG. 12 shows a top perspective view of two containers according to FIG. 6 in its folded position and stacked.
Figure 13:
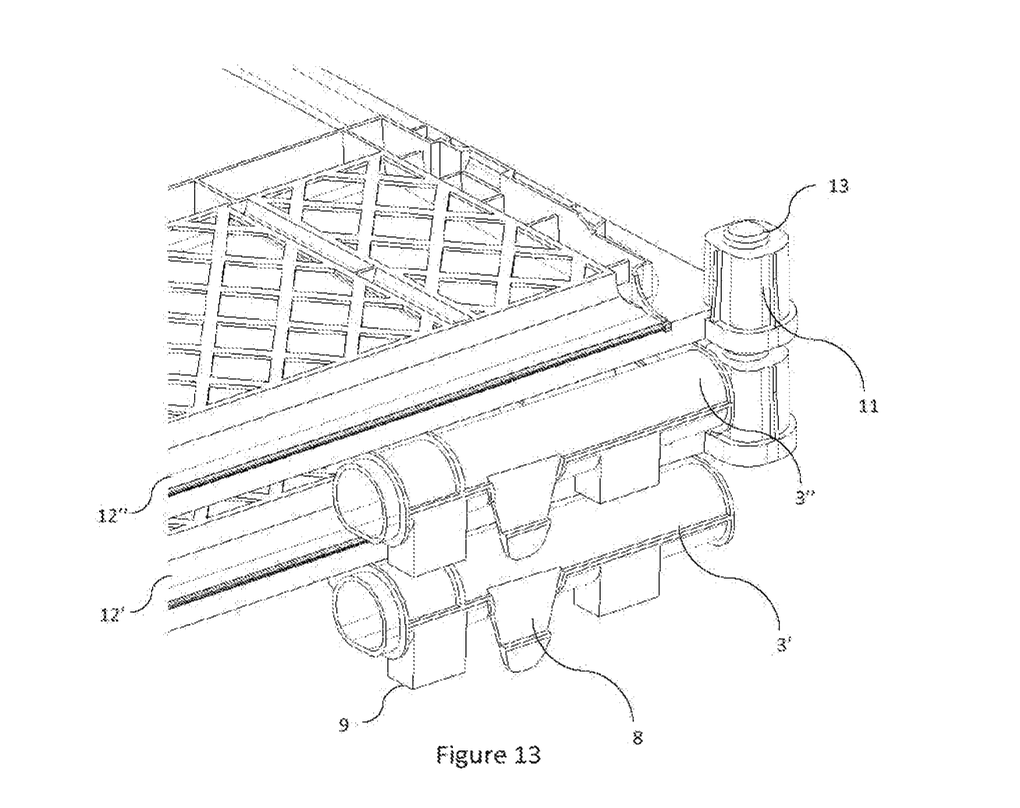
FIG. 13 shows a detailed top perspective view of two containers according to a second embodiment of the invention in its folded position and stacked.

FIG. 12 shows two containers 14' and 14" stacked in its folded position, where it is appreciated that the junction systems of a container are mounted on the surfaces 12 of the other container. In this context, it is appreciated that column 3' is mounted on the surface 12" corresponding to the container 14" according to FIG. 12. Moreover, FIG. 13 shows the assembly of containers stacked in the collapsible position using a junction system according to a second embodiment of the invention, wherein the column 3" is mounted on the surface 12'. The distribution of stacked containers respect to its columns and shelter surfaces allows to reduction of the space between stacked containers and, therefore reduces the space used by junction systems folded during stacking of folded containers. Moreover, the present distribution allows stacked containers to remain in position thanks to the shape of the surfaces 12, where they are adapted to the external configuration of columns 3.

In the other hand FIG. 13 also shows that the surfaces 12 may be part of the whole extension of the side walls alternative mode to that taught in to FIG. 11 where only the surfaces 12 are part of the extension of the wall form primarily a part equivalent to the size of column 3.

Figure 14:
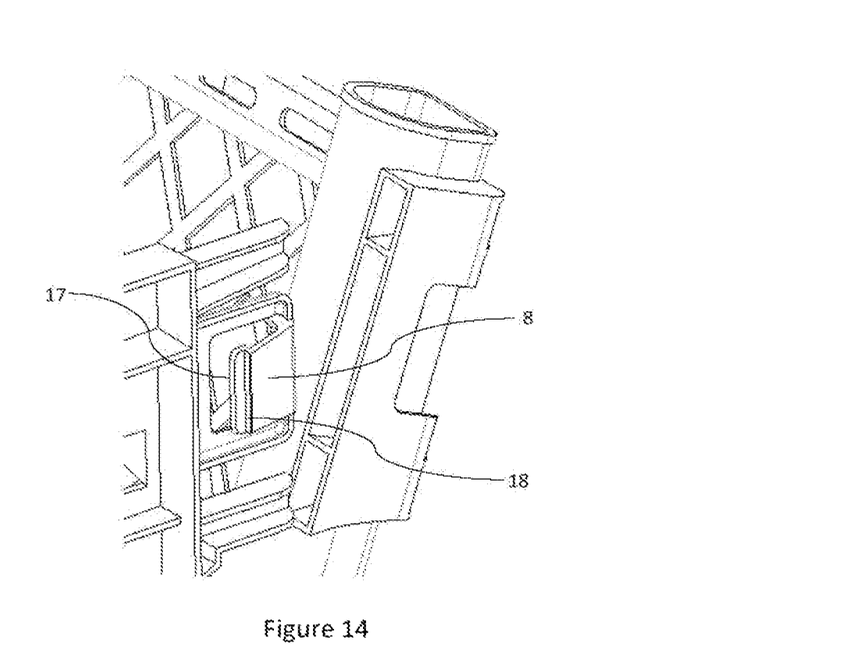
FIG. 14 shows in detail the active closure means according to a first embodiment of the invention.
Figure 15:
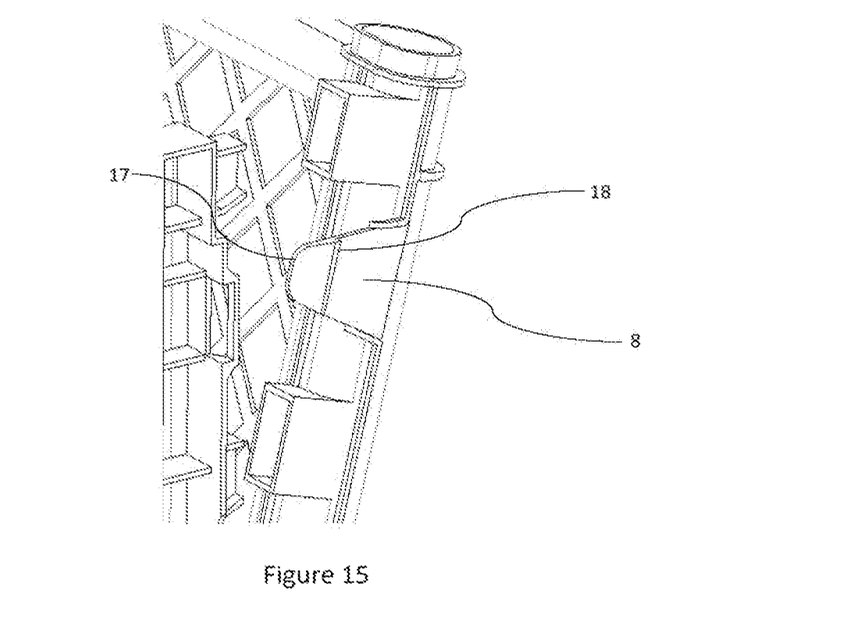
FIG. 15 shows in detail the active closure means according to a second embodiment of the invention

Finally FIGS. 14 and 15 teach details of modalities relative to active closure means of the invention where it is shown that the outer edge (17) of said closure means in particular active male closure means (8) do not interfere with the stepped profile or notch (18) forming the effective closing area being independent of said notch (18) In this sense, any imperfections in the ends of the tab or active male closure means (8) fairly common situation in manufacturing by molding mainly because of the continuous wear of the molds will not affect the operation of the junction system of the invention given that the notch (18) is kept free from formation of such imperfections.

Other embodiments of the invention not shown in the figures comprise the use of columns of cylindrical body with different shapes as well as devices and closure means located in different distributions and in different quantities, all with the aim of proposing a junction system that is light and integrated comprising closure means and a column, increasing the resistance of both the union proposed by the system as the general resistance of structures to be joined.

The invention claimed is:

1. A junction system for selectively joining a first wall and a second wall of a foldable container, the junction system comprising:
    a column comprising a hollow cylindrical body and being molded integrally together with the first wall;
    a first closure element molded integrally together with the column, the first closure element extending from the column; and
    a second closure element molded integrally together with the second wall, the second closure element extending from the second wall, wherein the first closure element and the second closure element cooperate with each other to facilitate selective joining of the first wall and the second wall together.

2. The junction system according to claim 1, wherein the hollow cylindrical body has a substantially circular cross-sectional shape.

3. The junction system according to claim 1, further comprising a base which is configured to provide underlying support to the column when the first wall and the second wall are joined together.

4. The junction system according to claim 1, wherein the first closure element comprises a female closure element and the second closure element comprises a male closure element.

5. The junction system according to claim 4, wherein the male closure element comprises a flange and the female closure element defines a slot, and wherein the flange is selectively insertable into the slot to facilitate joining of the first wall and the second wall together.

6. The junction system according to claim 5, wherein the flange comprises a notch.

7. The junction system according to claim 1, wherein the second closure element is substantially coplanar with the second wall.

8. The junction system according to claim 1, wherein the column defines a perimeter and the first closure element extends beyond the perimeter, and wherein the column comprises a corner element.

9. A container comprising:
a bottom wall;
a first wall pivotally coupled with the bottom wall;
a second wall pivotally coupled with the bottom wall adjacent the first wall;
a column comprising a hollow cylindrical body and being molded integrally together with the first wall;
a first closure element molded integrally together with the column, the first closure element extending from the column; and
a second closure element molded integrally together with the second wall, the second closure element extending from the second wall, wherein the first closure element and the second closure element cooperate with each other to facilitate selective joining of the first wall and the second wall together.

10. The container according to claim 9, wherein the hollow cylindrical body has a substantially circular cross-sectional shape.

11. The container according to claim 9, wherein the bottom wall comprises a base which is configured to provide underlying support to the column when the first wall and the second wall are joined together.

12. The container according to claim 9, wherein the first closure element comprises a female closure element and the second closure element comprises a male closure element.

13. The container according to claim 12, wherein the male closure element comprises a flange and the female closure element defines a slot, and wherein the flange is selectively insertable into the slot to facilitate joining of the first wall and the second wall together.

14. The container according to claim 13, wherein the flange comprises a notch.

15. The container according to claim 9, wherein the second closure element is substantially coplanar with the second wall.

16. The container according to claim 9, wherein the column defines a perimeter and the first closure element extends beyond the perimeter, and wherein the column comprises a corner element.

17. The container according to claim 11, wherein the base comprises a latching feature configured to facilitate stacking of the container on an underlying container.

18. The container according to claim 17, wherein the hollow cylindrical body is configured to selectively interact with the latching feature to facilitate engagement between the column and the base when the first wall and the second wall are engaged together.

19. The container according to claim 9, wherein the bottom wall comprises a plurality of ribs.

20. The container according to claim 19, wherein each rib of the plurality of ribs is substantially T-shaped.

21. The container according to claim 20, wherein at least one of the first wall and the second wall comprises a thickness of about 1.2 mm.

* * * * *